W. E. Bond,
Billiard Table.
No. 93,272. Patented Aug. 3, 1869.

Witnesses.
Geo. W. Tibbitts
L. B. Eager

Inventor.
W. E. Bond

United States Patent Office.

W. E. BOND, OF CLEVELAND, OHIO.

Letters Patent No. 93,272, dated August 3, 1869.

MODE OF CONSTRUCTING BILLIARD AND OTHER GAME-TABLES.

The Schedule referred to in these Letters Patent and making part of the same.

*To all whom it may concern:*

Be it known that I, W. E. BOND, of Cleveland, county of Cuyahoga, in the State of Ohio, have invented a new and improved Mode of Constructing Billiard or other Game-Tables; and I do hereby declare that the following is a full and exact description thereof, reference being had to the accompanying drawings, and to the letters of reference marked thereon.

Figure 1:
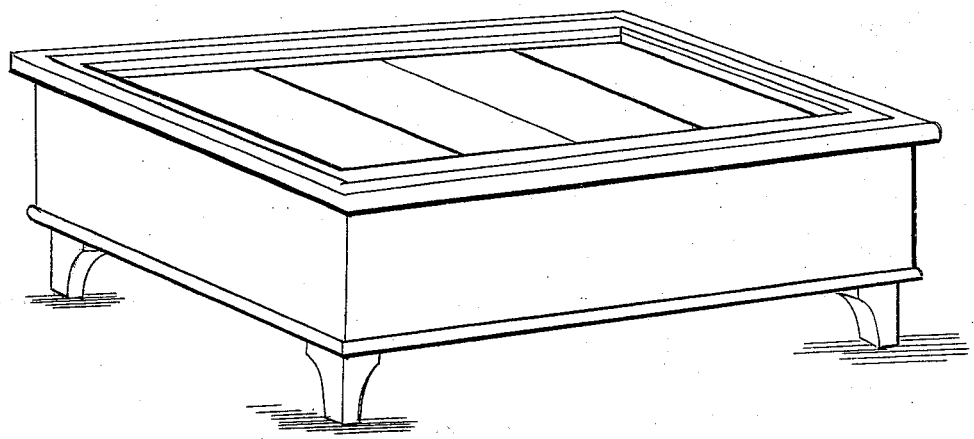
Figure 1 is a perspective view, showing the various modes of finishing the surface.

The nature of this improvement consists in the application of a cement composition, which becomes hard, for the bed of a billiard or other table, the said composition being laid upon a foundation of slate, wood, iron, or other suitable material, in the frame-work of said table, which forms the body of the bed, and may be covered with a cloth, in the usual manner, or may be painted, or a finish of flock may be added to the composition, resembling cloth, and which, adhering to it, makes a more durable surface.

In the drawings—

A represents the frame for supporting the bed of the table, and can be made of any desired form suitable for billiard or other tables.

Figure 2:
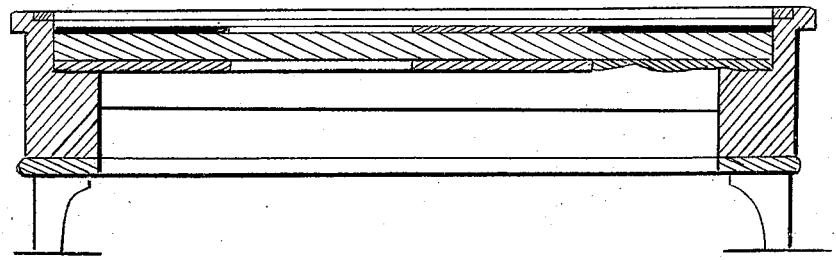
Figure 2 is a longitudinal section.

B represents the foundation of the bed, which may be made of iron, glass, wood, slate, or any other suitable material, which is placed in the frame, as shown in fig. 2.

A cement composition, is then placed on this foundation, which soon hardens, forming a very durable and cheap body for the bed of the table.

D D represent the different ways of finishing the surface of the bed, and which can be painted or covered with cloth, as in the usual way, or a finish of flock may be added, which renders it very durable, and resembles the cloth now used for such purposes.

A cushion-frame, E, for billiard-tables may be placed round the edges of the table, making it a complete table for that game. It is also equally adapted for croquet or other similar games.

This mode of construction is superior to those now in use, in this, that it makes a complete and unbroken bed, and is very durable, not likely to crack, or otherwise get out of order.

It may also be made light or heavy, as may be desired. In the preparation of the composition as a table for family or private use, which it would be convenient to remove occasionally, it might be made light, but for permanent tables, when it would be desirable to have it solid or steady, the composition may be prepared so as to be heavier.

What I claim, and desire to secure by Letters Patent, is—

1. Forming the beds of billiard and other gaming-tables of cement, substantially as herein described.

2. A billiard or other gaming-table, the bed of which is composed of cement, enclosed in a suitable frame-work, substantially as herein set forth.

W. E. BOND.

Witnesses:
GEO. W. TIBBITTS,
GEO. HESTER.